(12) United States Patent
Tan et al.

(10) Patent No.: US 9,427,905 B2
(45) Date of Patent: *Aug. 30, 2016

(54) APPARATUS AND METHOD FOR DETECTING A POSITION OF AN ACTUATOR PISTON

(71) Applicant: Synventive Molding Solutions, Inc., Peabody, MA (US)

(72) Inventors: Zhuang Rui Tan, Evanston, IL (US); Lin Yang, Lynnfield, MA (US)

(73) Assignee: Synventive Molding Solutions, Inc., Peabody, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/834,586

(22) Filed: Aug. 25, 2015

(65) Prior Publication Data

US 2015/0360406 A1 Dec. 17, 2015

Related U.S. Application Data

(63) Continuation of application No. 13/567,609, filed on Aug. 6, 2012, now Pat. No. 9,144,929.

(51) Int. Cl.

| | | |
|---|---|---|
| *G01B 7/14* | (2006.01) | |
| *B29C 45/76* | (2006.01) | |
| *B29C 45/28* | (2006.01) | |

(52) U.S. Cl.
CPC ......... *B29C 45/7613* (2013.01); *B29C 45/281* (2013.01); *B29C 45/2806* (2013.01);
(Continued)

(58) Field of Classification Search
CPC ............ G01D 9/20; G01D 5/12; G01D 5/14; G01D 5/145; G01D 5/2046; G01D 5/147; G01R 33/07; F15B 15/1428; F15B 15/2892; F15B 15/2807; B29C 45/281; B29C 45/261; B29C 45/2896; B29C 45/2806; B29C 2045/282; B29C 2045/2824; B29C 2045/5084; B29C 2045/2865; B29C 2045/2872; B29C 2045/2831; B29C 2045/2841
USPC ....... 324/207.2, 207.22, 24, 26, 13, 11, 262; 417/415, 572, 417, 206, 416, 469, 505, 417/509; 425/145, 146, 192 R, 564, 572, 425/568, 566
See application file for complete search history.

(56) References Cited

U.S. PATENT DOCUMENTS 4,689,553 A * 8/1987 Haddox .................. F15B 15/28
324/635
4,749,936 A * 6/1988 Taplin .................... G01D 5/243
318/669
(Continued)

OTHER PUBLICATIONS

Int'l. Preliminary Report on Patentability issued Feb. 10, 2015 in corresponding Int'l. Appln. No. PCT/US2012/067379.
(Continued)

*Primary Examiner* — Son Le
*Assistant Examiner* — Thang Le
(74) *Attorney, Agent, or Firm* — Polsinelli PC

(57) ABSTRACT

Apparatus and method for detecting a position of an actuator piston driving a valve pin in an injection molding system. The apparatus includes an actuator housing having a body portion, surrounding an axial bore, of a substantially non-magnetic and/or magnetically permeable material, a piston, movable within the axial bore for driving a valve pin, the piston including a magnetic member generating a magnetic field such that axial movement of the piston in the bore modifies the magnetic field according to the position of the piston relative to a detection position, and a magnetic field detector attached to an exterior surface of the body portion at the detection position for detecting the magnetic field associated with the position of the piston and generating an output signal determined by the piston position.

19 Claims, 7 Drawing Sheets

(52) U.S. Cl.
CPC ...... *B29C 45/76* (2013.01); *B29C 2045/2865* (2013.01); *B29C 2945/76083* (2013.01); *B29C 2945/76277* (2013.01); *B29C 2945/76381* (2013.01); *B29C 2945/76488* (2013.01); *B29C 2945/76568* (2013.01); *B29C 2945/76755* (2013.01); *B29C 2945/76859* (2013.01)

(56) References Cited

U.S. PATENT DOCUMENTS

| | | | |
|---|---|---|---|
| 4,755,636 A | | 7/1988 | Akio |
| 4,793,241 A | | 12/1988 | Mano et al. |
| 5,103,172 A | * | 4/1992 | Stoll .................. F15B 15/1428 324/207.11 |
| 5,231,352 A | | 7/1993 | Huber |
| 5,470,219 A | * | 11/1995 | Yokoyama .......... B29C 45/2737 264/328.15 |
| 6,086,357 A | * | 7/2000 | Steil ...................... B29C 45/281 425/564 |
| 6,202,406 B1 | | 3/2001 | Griffin et al. |
| 6,460,335 B1 | * | 10/2002 | Buschatz .................. F02G 1/04 236/78 D |
| 6,564,694 B2 | | 5/2003 | Zumberge et al. |
| 6,633,157 B1 | | 10/2003 | Yamaki et al. |
| 7,044,444 B2 | | 5/2006 | Haubold et al. |
| 8,192,191 B2 | * | 6/2012 | Tooman ................ B29C 45/281 425/146 |
| 8,395,374 B2 | | 3/2013 | Newman et al. |
| 8,465,688 B2 | * | 6/2013 | Feick .................... B29C 45/281 264/328.1 |
| 2002/0074994 A1 | * | 6/2002 | Blubaugh ........... F15B 15/2892 324/207.13 |
| 2002/0164392 A1 | * | 11/2002 | Kazmer .................. B29C 45/27 425/144 |
| 2003/0111004 A1 | | 6/2003 | Enzaki et al. |
| 2004/0047942 A1 | | 3/2004 | Vasapoli et al. |
| 2004/0143225 A1 | | 7/2004 | Callan et al. |
| 2006/0222726 A1 | * | 10/2006 | Tooman ................ B29C 45/281 425/146 |
| 2007/0216401 A1 | | 9/2007 | Baak et al. |
| 2008/0012432 A1 | * | 1/2008 | Togare .................. H02K 7/075 310/24 |
| 2008/0211522 A1 | | 9/2008 | Mohr et al. |
| 2009/0061034 A1 | | 3/2009 | Vasapoli et al. |
| 2011/0079138 A1 | * | 4/2011 | Storrie ..................... G01B 7/14 91/1 |
| 2011/0204888 A1 | | 8/2011 | Han |
| 2014/0041415 A1 | | 2/2014 | Helfenstein et al. |

OTHER PUBLICATIONS

Int'l. Search Report and Written Opinion mailed Mar. 3, 2014 in corresponding Int'l. App.n No. PCT/US2012/067379.
MHR Series Miniature LVDT and Accessories, Schaevitz Sensors (acquired by Measurement Specialties Aug. 2000), Hampton, VA, Schaevitx catalog pp. 28, 29, 58 (at least as early as Aug. 2000).
LVDT On-Off Piston detection sensor and Mounted Switch shown in Injection Molding Activator Cross Sectional Marked Up Drawings showing VLDT embedded in non-magnetic LVDT housing mounted to end of magnetic actuator housing; magnet in rod which extends from end of piston; sold by applicant Synventive Molding Solutions, Peabody, MA.
PNC7518M07 Service and Assembly Guideline, Synventive Molding Solutions, Inc., Peabody, MA, pp. 1-29 (Mar. 28, 2012); two on-off proximity sensors (1.19) mounted on exterior sidewall of actuator housing (1.1),, each sensor detects one location (position) of piston; two magnets (1.3.3) embedded in outer non-magnetic part (piston web 1.3.2) of piston; inner steel part (1.4) of piston.
PNC7518MO6 Service and Assembly Guideline, Synventive Molding Solutions Inc., Peabody, MA, pp. 1-25 (Mar. 27, 2012) (similar to PNC7518MO7); see magnets (1.2.3) in piston web (1.2.2) and sensors (1.13) on actuator housing sidewall (1.1).
PNC7518MO8 Service and Assembly Guideline, Synventive Molding Solutions Inc., Peabody, MA, pp. 1-19 (Mar. 28, 2012) (similar to PNC7518MO7); see magnets (1.3.3) in piston web (1.3.3) and sensors (1.19) on actuator housing sidewall (1.1).
McMaster-Carr 3-Wire DC Metallic Oxide On-Off Proximity Switches (p. 2 of website) and Long Sensing Distance Proximity Switch, McMaster-Carr.com website (Apr. 21, 2014) (example of single position location switch; see e.g. sensor 130 in Fig. 4a of Vasapoli US 2004/47942).
Plate Mounted Hydraulic Actuator with Linear Potentiometer (no magnet or magnetic field sensor); one page diagram, Synventive Molding Solutions Inc., Peabody, MA (example of linear potentiometer for detecting multiple axial positions of piston via mechanical rod movement; see e.g., potentiomoter 100 in Figs. 2-3 and 6 of Vasapoli US 2004/47942.
Decision to Grant a European Patent dated Jan. 8, 2016 in corresponding European Patent Application 12813587.8.

* cited by examiner

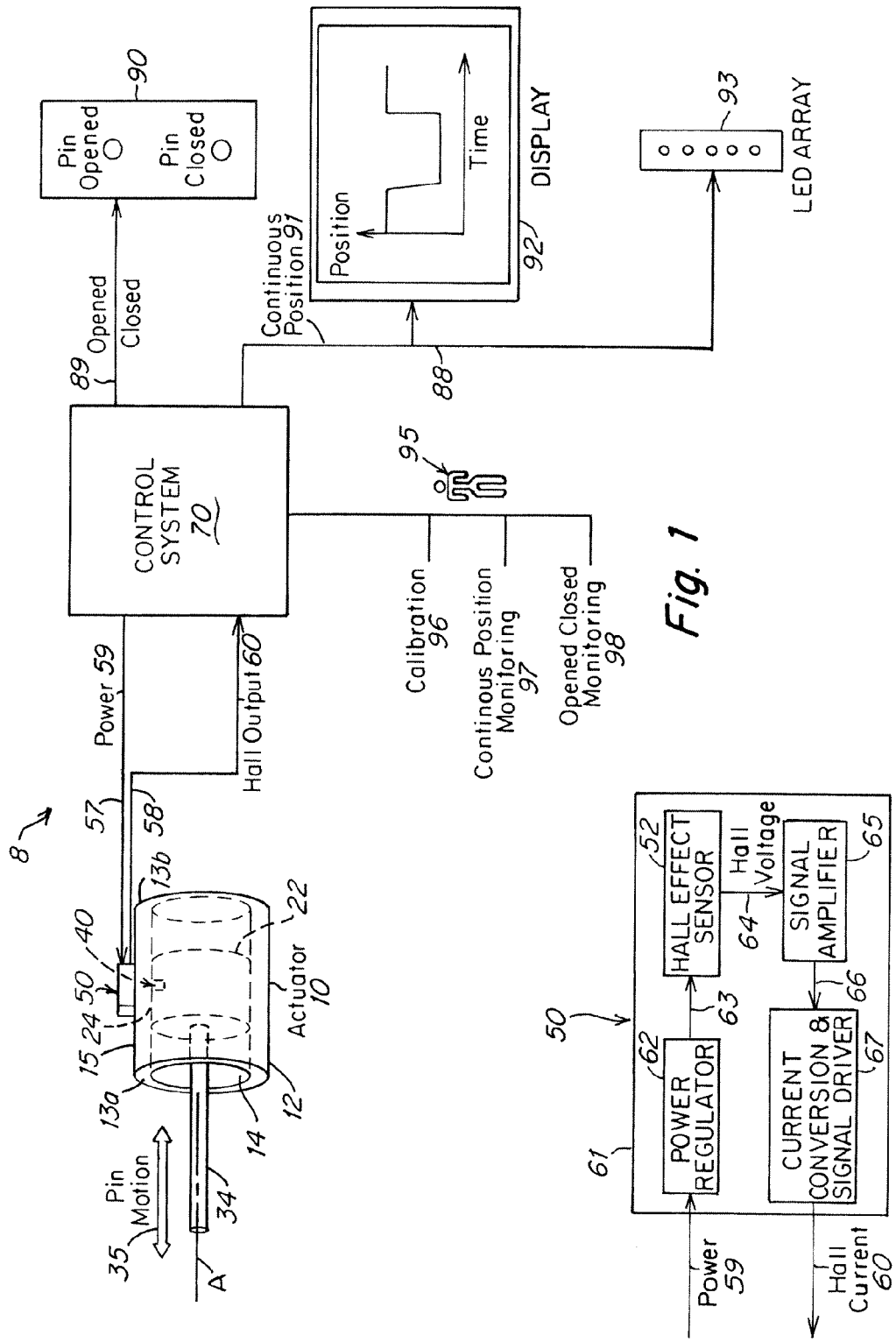

APPARATUS AND METHOD FOR DETECTING A POSITION OF AN ACTUATOR PISTON

FIELD OF THE INVENTION

The present invention relates to actuator pistons for driving valve pins in an injection molding system, and more particularly to a system and method for detecting a position of a piston with a magnetic field detector.

BACKGROUND

Injection molding systems have been developed having flow control mechanisms (e.g., a controller) that control the movement and/or rate of movement of a valve pin over the course of an injection cycle to cause the pin to move to one or select positions and/or to control the rate of movement of the pin over the course of the injection cycle. In one embodiment, the pin movement is controlled in order to raise or lower the rate of flow of fluid material to correspond to a predetermined profile of fluid flow rates for the injection cycle. A sensor is typically provided that senses a condition of the fluid material or of the apparatus (such as pin position) and sends a signal indicative of the sensed condition to a program contained in a controller that uses the signal as a variable input to control movement of the valve pin in accordance with the predetermined profile.

SUMMARY OF THE INVENTION

The present invention relates to an apparatus and method for detecting a position of a piston disposed within an actuator in an injection molding system. In contrast to the prior art detection of a magnetic field by use of a linear variable differential transformer (LVDT), wherein a rod extending from one end of the piston carries a ferromagnetic core that slides within a tube carrying the transformer coils, the present invention utilizes a new structural and compositional arrangement of elements for detecting a magnetic field, and provides benefits of more reliable and robust measurement as well as a more compact arrangement of elements.

In accordance with the invention, an actuator housing includes a body portion which is of a substantially non-magnetic and/or magnetically permeable material. The body portion allows transmission of a magnetic field generated by a magnetic member embedded in a piston such that axial movement of the piston within a bore of the non-magnetic or magnetically permeable body portion can be detected by a magnetic field detector attached to an exterior surface of the body portion. In one embodiment, the magnetic field detector is a hall effect sensor. The sensor may comprise a portion of a hall effect circuit, mounted to the outside of the actuator housing, for detecting changes in the magnetic flux density generated by a magnetic member disposed in the piston. When the piston moves, the detector measures the change in flux density and generates a changing output voltage. The output voltage may be processed, e.g., amplified and/or converted to an output current by, e.g, the hall effect circuit. The magnetic flux density can be highest at the bottom, middle, or top of the piston stroke depending on where the detector is placed relative to the stroke of the piston and the position of the embedded magnetic member (magnet) in the piston. The output signal of the hall effect sensor can then be used in, for example, closed loop control applications or open loop status reporting (monitoring) applications.

In accordance with one embodiment of the invention, an apparatus is provided for detecting a position of an actuator piston driving a valve pin in an injection molding system, the apparatus comprising:

an actuator housing having a body portion, surrounding an axial bore, of a substantially non-magnetic and/or magnetically permeable material;

a piston, movable within the axial bore for driving a valve pin, the piston including a magnetic member generating a magnetic field such that axial movement of the piston in the bore modifies the magnetic field according to the position of the piston relative to a detection position;

a magnetic field detector attached to an exterior surface of the body portion at the detection position for detecting the magnetic field associated with the position of the piston and generating an output signal determined by the piston position.

In another embodiment, the apparatus includes an electronic controller that processes a value indicative of the output signal to generate a control signal to control the piston position.

In another embodiment, the electronic controller includes a user interface for receiving user input for adjusting the control signal to control the piston position.

In another embodiment, the user interface includes operator commands for one or more modes of operation including self calibration, continuous monitoring of pin position, and discrete determination of pin position as opened or closed.

In another embodiment, in the self calibration mode the piston is actuated by external controls and the electronic controller converts the output signal(s) to position unit(s).

In another embodiment, the electronic controller receives an analog signal from the detector for continuous monitoring of the pin position.

In another embodiment, the electronic controller includes a sampler component for sampling the output signal at a selected sampling rate.

In another embodiment, an electronic monitor that processes a value indicative of the output signal for monitoring the piston position.

In another embodiment, the valve pin is driven by the piston to multiple positions with respect to a gate.

In another embodiment, the valve pin is positionable between opened and closed positions with respect to a gate.

In another embodiment, the detector comprises a Hall effect sensor.

In another embodiment, the detector comprises a Hall effect circuit including a Hall effect sensor and one or more of a power regulator, signal amplifier, current converter, and signal driver.

In another embodiment, the Hall effect sensor generates a voltage output which is proportional to the displacement of the magnetic member relative to the sensor.

In another embodiment, the voltage output is amplified and converted to a current signal by the Hall effect circuit.

In another embodiment, the current signal is transmitted from an output port of the Hall effect circuit to an input port of an electronic controller that generates a control signal based on the current signal to control the piston position.

In another embodiment, the apparatus includes a display for viewing an indicator of the pin position.

In another embodiment, the display comprises one or more of light(s); LED(s); a graph of pin position versus time; and an indicator of pin opened and pin closed.

In another embodiment, the actuator housing has a sidewall aligned with the axial bore and the detector is mounted on the sidewall.

In another embodiment, the axial bore extends between opposing ends of the actuator housing and the detector is mounted on one of the opposing ends.

In another embodiment, the magnetic member is located in an aperture in the piston.

In another embodiment, the piston has an enlarged piston head and the magnetic member is located in the piston head.

In another embodiment, the actuator housing is located on a manifold plate.

In another embodiment, the actuator housing is located in the top clamp plate.

In accordance with another embodiment of the invention, in an injection molding system, an apparatus is provided for detection of position of a piston disposed within an actuator cylinder, the actuator cylinder comprising a wall having an interior surface surrounding and defining a bore within which the piston is adapted to move to a plurality of travel positions extending between upstream and downstream positions contained within the bore, the wall of the actuator cylinder having an exterior surface and a body extending between the interior and exterior surfaces, the apparatus comprising:

a magnetic member having a magnetic field, the magnetic member being mounted to the piston for movement together with the piston between the upstream and downstream positions, wherein movement of the piston modifies the magnetic field to a modified degree or quality that is dependent on the travel position of the piston relative to a detection position;

the body of the cylinder being substantially non-magnetic and/or magnetically permeable;

a magnetic field detector mounted to the outside surface of the cylinder at the detection position wherein the body of the cylinder is disposed between the detection position and the magnetic member, the detection position being disposed at a position where the magnetic field of the magnetic member is detectable by the magnetic field detector at all travel positions of the piston between the upstream and downstream positions, the magnetic field detector detecting the modified degree or quality of the magnetic field and generating a signal unique to each travel position based on the detected modified degree or quality of the magnetic field, a processor receiving the signals generated by the magnetic field detector, the processor using the received signals to determine the travel position of the piston.

In another embodiment, the processor includes a triggering signal that can be used in providing instructions that control a drive mechanism that drives the piston, the instructions comprising an algorithm that use the determined travel position of the piston to instruct the drive mechanism to drive the piston in a predetermined manner during the course of an injection cycle.

In another embodiment, the processor includes a triggering signal that can be used in providing instructions that instruct the drive mechanism to drive the piston such that the piston travels continuously upstream from a gate closed position to an intermediate upstream travel position at first travel velocity and such that the piston travels continuously upstream from the intermediate travel position to a predetermined upstream position at a second travel velocity that is higher than the first travel velocity.

In accordance with another embodiment of the invention, a method is provided of determining the position of a piston that is disposed within an actuator cylinder, the actuator cylinder comprising a wall having an interior surface surrounding and defining a bore within which the piston is adapted to move to a plurality of travel positions extending between upstream and downstream positions contained within the bore, the wall of the actuator cylinder having an exterior surface and a body extending between the interior and exterior surfaces, the method comprising;

forming the body of the cylinder from a substantially non-magnetic and/or magneticallhy permable material;

mounting a member that generates a magnetic field on the piston;

driving the piston together with the magnetic field generating member within the bore to one or more of the travel positions;

mounting a magnetic field detector on the outside surface of the cylinder at a detection position selected to enable the detector to detect a change in a degree or quality of the magnetic field generated by the member that generates the magnetic field;

detecting the change in degree or quality of the magnetic field with the detector at one or more selected travel positions;

using the detected change in degree or quality of the magnetic field to determine the travel position of the piston at one or more travel positions between the upstream and downstream positions.

In another embodiment, the method includes using the determined travel positions of the piston to control movement of the piston along a predetermined path of withdrawal from a gate of a mold at one or more predetermined drive rates or one or more predetermined velocities of withdrawal.

BRIEF DESCRIPTION OF THE DRAWINGS

The above and further advantages of the invention may be better understood by referring to the following description in conjunction with the accompanying drawings in which:

FIG. 1 is a schematic of one embodiment of the invention in which a magnetic member is embedded in an actuator piston and is movable within an axial bore of an actuator housing made of a substantially non-magnetic and/or magnetically permeable material, and showing a control system for processing the output of the magnetic field detector mounted on the actuator housing;

FIG. 2 is a schematic block diagram of one embodiment of a hall effect circuit including a hall effect sensor for detecting the magnetic field, and additional circuit components for amplifying the signal and converting the signal to an output current signal;

DETAILED DESCRIPTION

Figure 3:
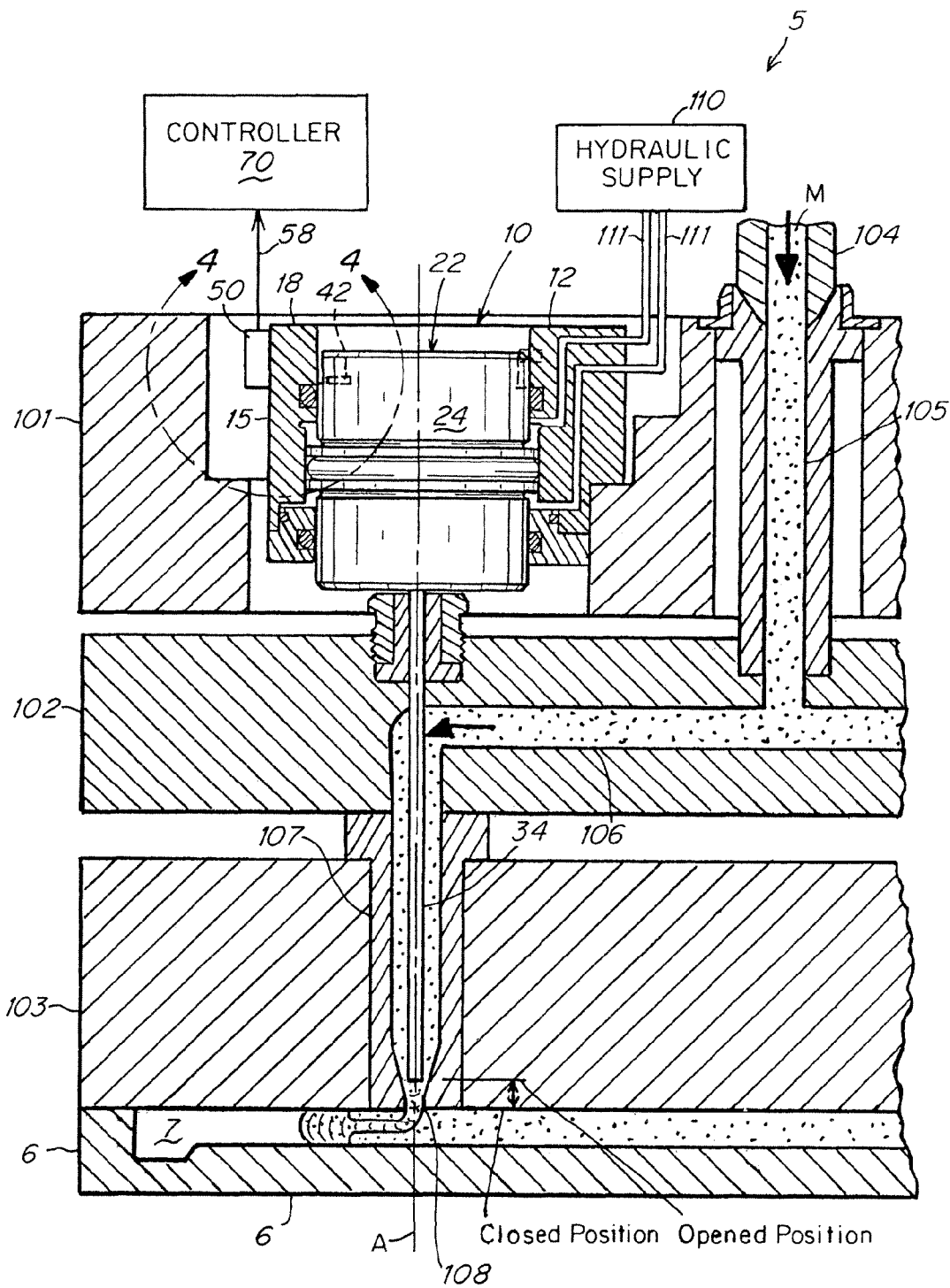
FIG. 3 is a schematic cross-sectional view of one embodiment of the position sensor mounted on an actuator housing mounted to the top plate of an injection molding system.

Various embodiments of the present invention are now described with reference to the drawings. In the following description, for purposes of explanation, numerous specific details are set forth in order to provide a thorough understanding of one or more implementations of the present invention. It will be evident, however, that the present invention may be practiced without these specific details. In other instances, well-known structures and devices are shown in block diagram form in order to facilitate describing the present invention.

As used in this application with regard to various monitoring and control systems, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The present invention may also be illustrated as a flow chart of a process of the invention. While, for the purposes of simplicity of explanation, the one or more methodologies shown in the form of a flow chart are described as a series of acts, it is to be understood and appreciated that the present invention is not limited by the order of acts, as some acts may, in accordance with the present invention, occur in a different order and/or concurrent with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

In various embodiments of the invention disclosed herein, the term "data" is used. Data means any sequence of symbols (typically denoted "0" and "1") that can be input into a computer, stored and processed there, or transmitted to another computer. As used herein, data includes metadata, a description of other data. Data written to storage may be data elements of the same size, or data elements of variable sizes. Some examples of data include information, program code, program state, program data, other data, and the like.

As used herein, computer storage media includes both volatile and non-volatile, removable and non-removable media for storage of information such as computer-readable instructions, data structures, program modules, or other data. Computer storage media includes RAM, ROM, EEPROM, FLASH memory or other memory technology, CD-ROM, digital versatile disc (DVDs) or other optical disk storage, magnetic cassettes, magnetic tape, magnetic disk storage or other magnetic storage devices, or any other medium which can be used to store desired information and which can be accessed by the computer.

The methods described below may be implemented in a suitable computing and storage environment, e.g., in the context of computer-executable instructions that may run on one or more processors, microcontrollers or other computers. In a distributed computing environment (for example) certain tasks are performed by remote processing devices that are linked through a communications network and program modules may be located in both local and remote memory storage devices. The communications network may include a global area network, e.g., the Internet, a local area network, a wide area network or other computer network. It will be appreciated that the network connections described herein are exemplary and other means of establishing communications between the computers may be used.

A computer may include one or more processors and memory, e.g., a processing unit, a system memory, and system bus, wherein the system bus couples the system components including, but not limited to, the system memory and the processing unit. A computer may further include disk drives and interfaces to external components. A variety of computer-readable media can be accessed by the computer and includes both volatile and nonvolatile media, removable and nonremovable media. A computer may include various user interface devices including a display screen, touch screen, keyboard or mouse.

FIG. 1 is a schematic diagram of a position detecting apparatus and method according to one embodiment of the invention. In the disclosed embodiment, a magnetic member is embedded in an actuator piston, which is movable within an axial bore of an actuator housing made of a substantially non-magnetic and/or magnetically permeable material. The magnetic member generates a magnetic field such that axial movement of the piston in the bore modifies the magnetic field according to the position of the piston relative to a detection position. A magnetic field sensor is attached to the exterior of the actuator housing at the detection position, whereby the sensor detects the magnetic field associated with the position of the piston and generates an output signal determined by the piston position. The output signal is then sent to a control system of an injection molding system, for one or more of monitoring and controlling the position of the piston. It is to be understood that the new position detector and method can be used with various detection circuits, molding machines and molding processes known to those skilled in the art.

In the position detection apparatus 8 shown in FIG. 1, an actuator 10 includes an actuator housing 12 and an actuator piston 22 movable in an axial bore 14 of the housing. The piston drives a valve pin 34 of an injection molding system; movement of the valve pin is illustrated by an arrow 35, co-axial with the movement of the piston 22 in the axial bore 14 of the housing.

A magnetic member 40, here a permanent magnet 42, is embedded in the piston sidewall 24. A magnetic field detector 50, here a hall effect sensor, is mounted on an exterior sidewall 15 of the actuator housing 12. The sensor may be part of a hall effect circuit 56 (see FIG. 2) mounted on the exterior sidewall of the actuator housing. The circuit has input/output channels 57/58 for transmitting a power input signal 59 from a control system 70, and a hall output signal 60 sent to the control system 70.

The control system, also commonly referred to as a controller, communicates with an injection molding system for monitoring the molding process. The injection molding system, one embodiment of which will be described in greater detail below with respect to FIG. 3, includes a mold having one or more pins each driven by an actuator for opening and closing an opening (a mold gate) to a mold cavity. The mold may have one or more cavities, each cavity having one or more pins. The actuator may be any type of known actuator, including an electrical, hydraulic or pneumatic actuator. The actuator drives a valve pin for opening and closing the gate (opening into the mold cavity), and the movement of each pin maybe monitored by one or more sensors or signals on/from the machine for determining one or more process parameters such as pin position, pin velocity, or melt pressure in the cavity or in a fluid channel upstream of the cavity (e.g., manifold), or a temperature in the cavity or in a fluid channel upstream of the cavity, or the output of mold cycle counter. The control system may implement a recipe i.e., a set of process parameters, for controlling the molding process.

The control system may also include various operator interfaces for inputting or modifying the process parameters, testing alternative process parameters, or monitoring the molding process. The control system 70 of FIG. 1 is shown communicating on channel 89 with a pin open/closed indicator panel 90, which may be mounted on the injection machine. The control system 70 also communicates via channel 88 transmitting continuous position data 91 to a graphical display 92 of pin position versus time; the display 92 may be provided on a user interface, such as a display screen of a computer or other user input device. The control system 70 may also transmit the continuous position data 91 to an LED indicator panel 93, in which an array of LEDs indicates to an operator the positions of one or more pins in the mold. A human operator 95 is shown interacting with the control system 70, via one or more interfaces, for one or more processes including calibration 96, continuous position monitoring 97 and opened/closed monitoring of the pins 98.

FIG. 2 is a more detailed schematic illustration of one embodiment of a hall effect sensor circuit that functions as the magnetic field detector 50 in the apparatus of FIG. 1. The circuit 56 is mounted to or enclosed in a housing 61 and is mounted on an exterior surface of the actuator housing 12. The circuit includes a hall effect sensor 52 that is typically aligned radially (transverse to the lengthwise axis A of the axial bore 14 of the housing) with or adjacent to the magnetic member 50 embedded in the piston 22 so that the hall effect sensor 52 of the circuit 56 can optimally (robustly) measure changes in the flux density as the piston moves axially in the bore 14 of the actuator housing. As described below, there are numerous alternative relative orientations of the piston magnetic member and hall effect sensor which would allow the sensor to measure changes in the flux density as the piston moves in the axial bore of the housing. The magnetic flux density will vary depending on where the sensor 52 is placed relative to the stroke of the piston and the position of the embedded magnetic member 50 in the piston. Although the present embodiment shows the sensor 52 mounted in/on the sidewall 15 of the actuator housing, in another embodiment the sensor can be mounted on either end 13*a*, 13*b* of the actuator housing.

Returning to FIG. 2, the hall effect circuit 56 includes a power regulator component 62 that receives power input signal 59. The regulator adjusts the power level as necessary and sends a power signal on channel 63 to the hall effect sensor 52. The output of the hall effect sensor is a hall voltage which is transmitted on channel 64 to a signal amplifier component 65. The amplified output signal is then sent on channel 66 to a current conversion and signal driver component 67 which converts the hall voltage to a hall current and outputs the hall current 60 to the control system 70. The communication channels between the various electronic components in the hall effect circuit and other between/among other components of the disclosed embodiment, can be any known communication media, including wired or wireless media.

FIG. 3 is an enlarged schematic view of one embodiment of the position detection apparatus of FIG. 1 mounted on an actuator of an injection molding system 5. FIG. 3 shows a portion of an injection machine with a series of aligned plates, including a top plate 101, to which the actuator 10 is mounted, a manifold 102, and a bottom plate 103, a mold 6 being secured to one surface of the bottom plate to form a mold cavity 7. A central nozzle 104 is shown feeding molten material M from the injection molding machine through a main inlet channel 105 to a distribution channel 106 of the manifold. This distribution channel commonly feeds a plurality of separate nozzles which all commonly feed into a common cavity 7 of the mold 6 to make one molded part. Here, just one nozzle 107 is shown feeding into the mold cavity 7 at a gate 108. During the injection cycle, molten material may be fed to one or more of the nozzles at one or more predetermined times, starting by opening a pin 34 of a nozzle 107 and allowing the fluid material(s) M (typically polymer or plastic material(s)) to flow into the mold cavity. The fluid material injected from the various nozzles may join together and form a single molded part in the mold cavity 7. The relative velocity at which the fluid material enters into the respective nozzles is controlled by the controller 70, and in particular embodiments by a mold recipe or target profile. Different types of profiles are desirable to uniformly fill different size individual cavities associated with each nozzle, or to uniformly fill different size sections of a single cavity. A user can observe the tracking of the actual process parameters (e.g., temperature, pressure, position) versus the target profile during the injection cycle in real time, or after the cycle completes.

FIG. 3 shows a hydraulic supply 110 feeding a plurality of fluid channels 111 into the actuator for moving the piston 22 axially in the bore 14 of the actuator housing (cylinder) 12. The magnetic member is a magnet 42 mounted in/on the piston, here embedded in the piston at a predetermined location in the piston cylindrical sidewall 24, which sidewall is slidable within the complementary cylindrical axial bore 14 of the actuator housing. The piston and housing may include locating elements (e.g., pin 17 and slot 26 shown in FIG. 6) for aligning the magnet and sensor. Here, two adjacent magnets 42*a*, 42*b* are radially disposed with respect to the hall effect sensor 52, in approximately the same or closely adjacent planes transverse to the axis A of the bore 14 of the housing 12. The body portion 18 of the housing (see FIGS. 3 and 6) located between the position sensor 52 and magnet(s) 42 is made of a substantially non-magnetic or magnetically permeable material, such as an iron-base superalloy that includes iron and one or more of nickel or its equivalent, chromium or its equivalent, aluminum or its equivalent, and typically also carbon or its equivalent. Preferably the non-magnetic or magnetically permeable material comprises between about 35% and about 65% by weight of iron and one or more of between about 15% and about 35% by weight of nickel, between about 5% and about 25% chromium, between about 0.10% and about 1% aluminum and between about 0.01% and about 0.15% carbon. The non-magnetic body portion 18 of the piston housing is used to reduce the magnetic flux interference between the magnet and sensor; in one embodiment, the entire cylindrical piston housing 12 is substantially non-magnetic or is magnetically permeable. The output of the hall effect sensor circuit 60 is then fed to the controller 70, as previously described.

Figure 4:
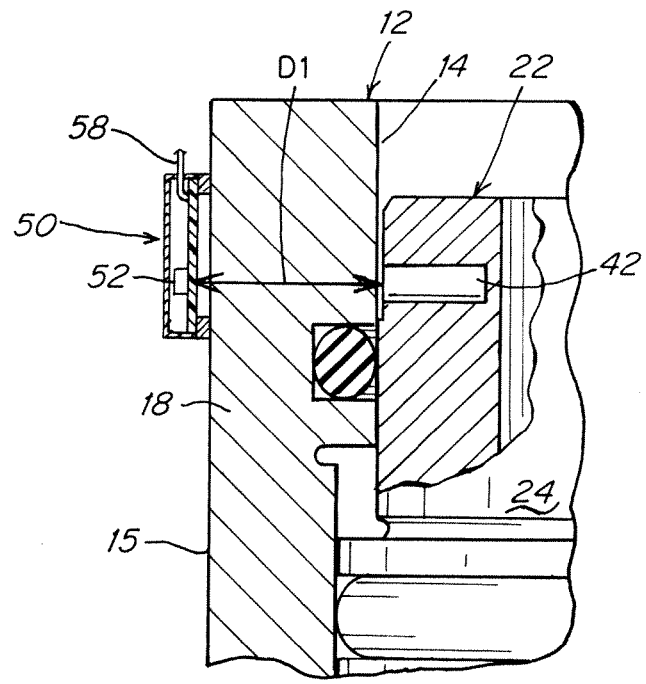
FIG. 4 is an enlarged cross-sectional view of the area encircled by arrow 4-4 of FIG. 3 showing the piston in the full down position.

FIG. 4 is an enlarged cross-sectional view of the magnet 42, position sensor 52, and the body portion 18 of the actuator housing between the magnet and sensor. Here, the magnet and sensor are radially aligned (transverse to axis A) and spaced apart a distance D1. The non-magnetic or magnetically permeable body portion 18 of the housing transmits the magnetic field lines (see FIGS. 10-11) from the magnet 42 to the sensor 52 to detect changes in the flux density as the magnet(s) 42 is/are moved axially in the bore 14. In FIG. 4 the piston 22 is at a lowermost (full down) position, where the sensor 52 and magnet 42 are radially aligned.

Figure 5:
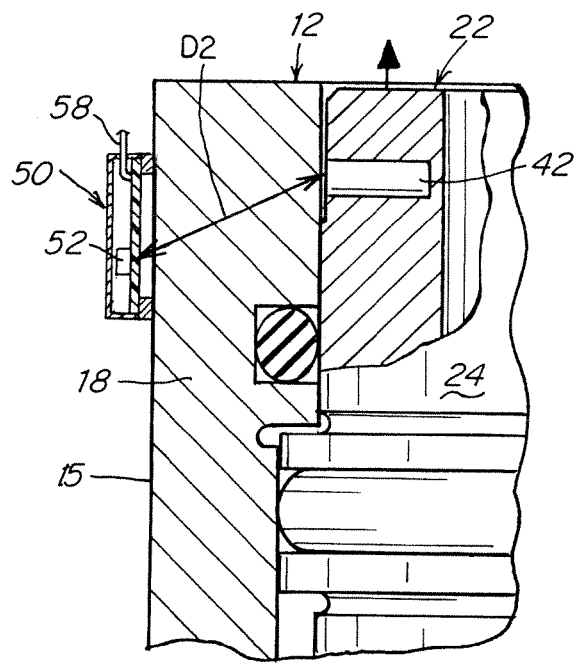
FIG. 5 is an enlarged cross-sectional view similar to FIG. 4 showing the piston in the full up position.

FIG. 5 is similar to FIG. 4 but shows the piston 22 in a full up position. Now, the magnet 42 and sensor 52 are no longer radially aligned, but are separated by a distance D2 at an oblique (less than 90°) angle to an axis transverse to the axis A of the axial bore 14. Such movement of the piston 22 in bore 14 changes the flux density measured by the sensor 52 at the sensor's axial location (the detection position), relative to the axial position of the magnet 42 in the piston, the sensor 52 outputing a voltage signal which is indicative of the piston position in the axial bore 14. The sensor voltage output can then be processed, e.g., amplified and/or converted to a current signal, and used in various closed loop control applications or in open loop status reporting applications.

Figure 6:
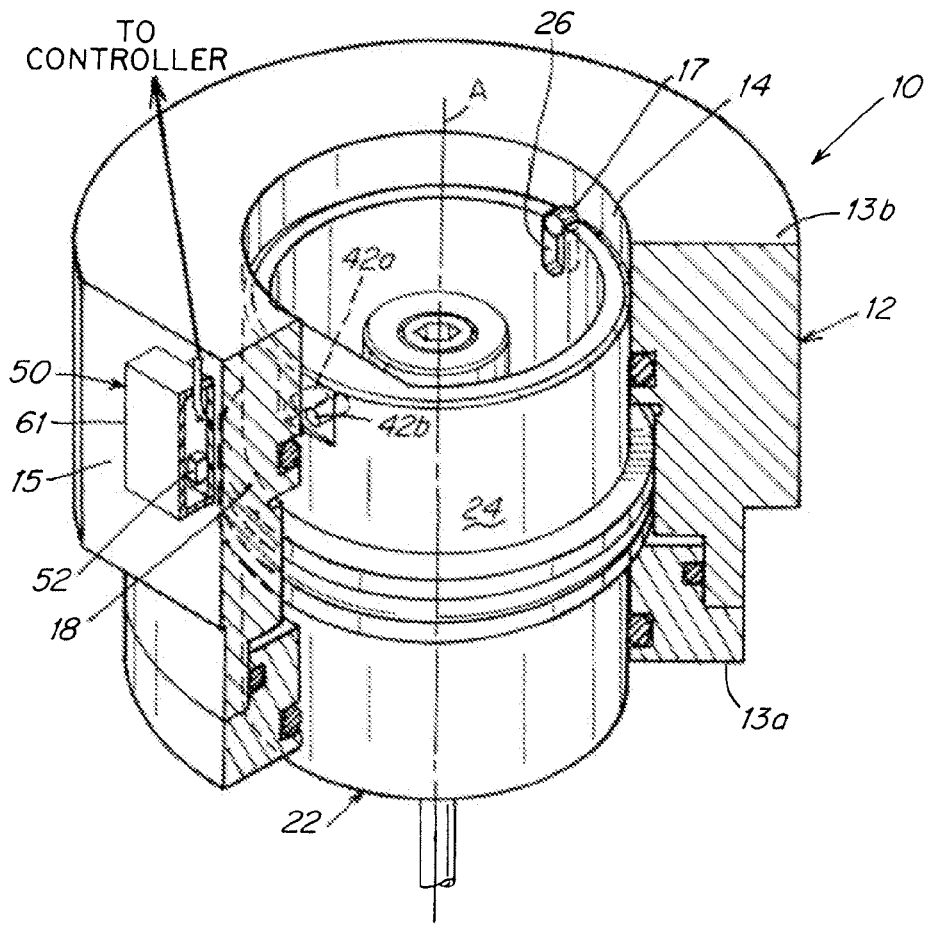
FIG. 6 is a perspective cross-sectional view of the actuator and position sensor of FIG. 3.

FIG. 6 is a perspective cross-sectional view of the position sensor 52 and actuator 10 of FIG. 3. This view shows two magnets 42a, 42b embedded in the cylindrical piston sidewall 24, both magnets being mounted in a roughly radial direction transverse to the piston bore axis A, and aligned adjacent to sensor 52. The sensor 52 is mounted substantially in the same radial plane as the magnets. The magnets can be moved axially up and down in the bore 14 toward or away from the sensor 52, during the molding process. The output of the sensor circuit 50 is fed to the controller 70, as shown.

Figure 7:
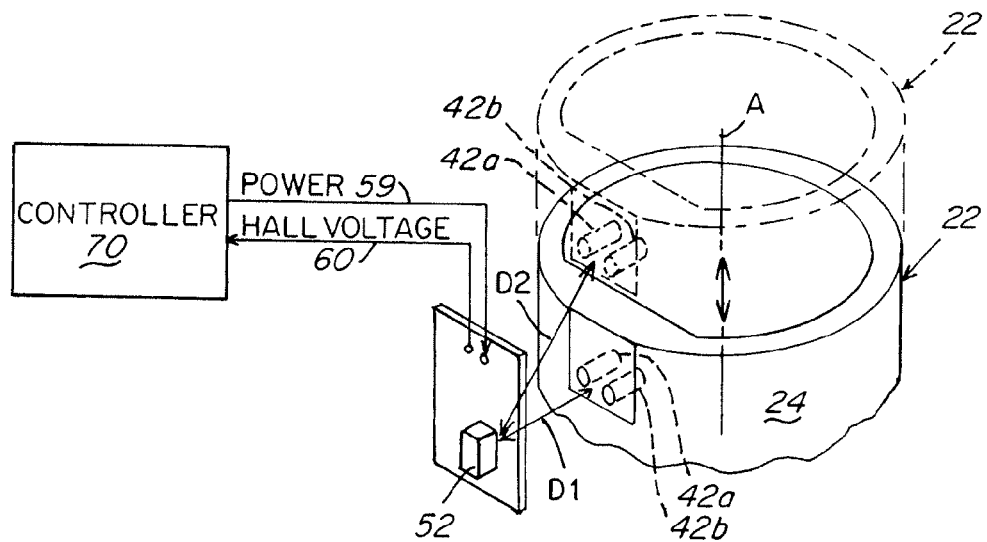
FIG. 7 is a schematic view of the actuator piston and position sensor of FIG. 6, showing the position sensor connected to a controller as in FIG. 3.

FIG. 7 is a schematic illustration of the piston of FIG. 6, showing two relative orientations between the sensor 52 and magnets 42. In a first lower piston position shown in solid lines, the two magnets 42a, 42b are roughly radially aligned with the sensor. In a second higher position of the piston shown in dashed lines, the two magnets are radially offset (see arrow D1) from the sensor, and thus the flux density measured by the sensor 52 will be different in the two positions.

Figure 8:
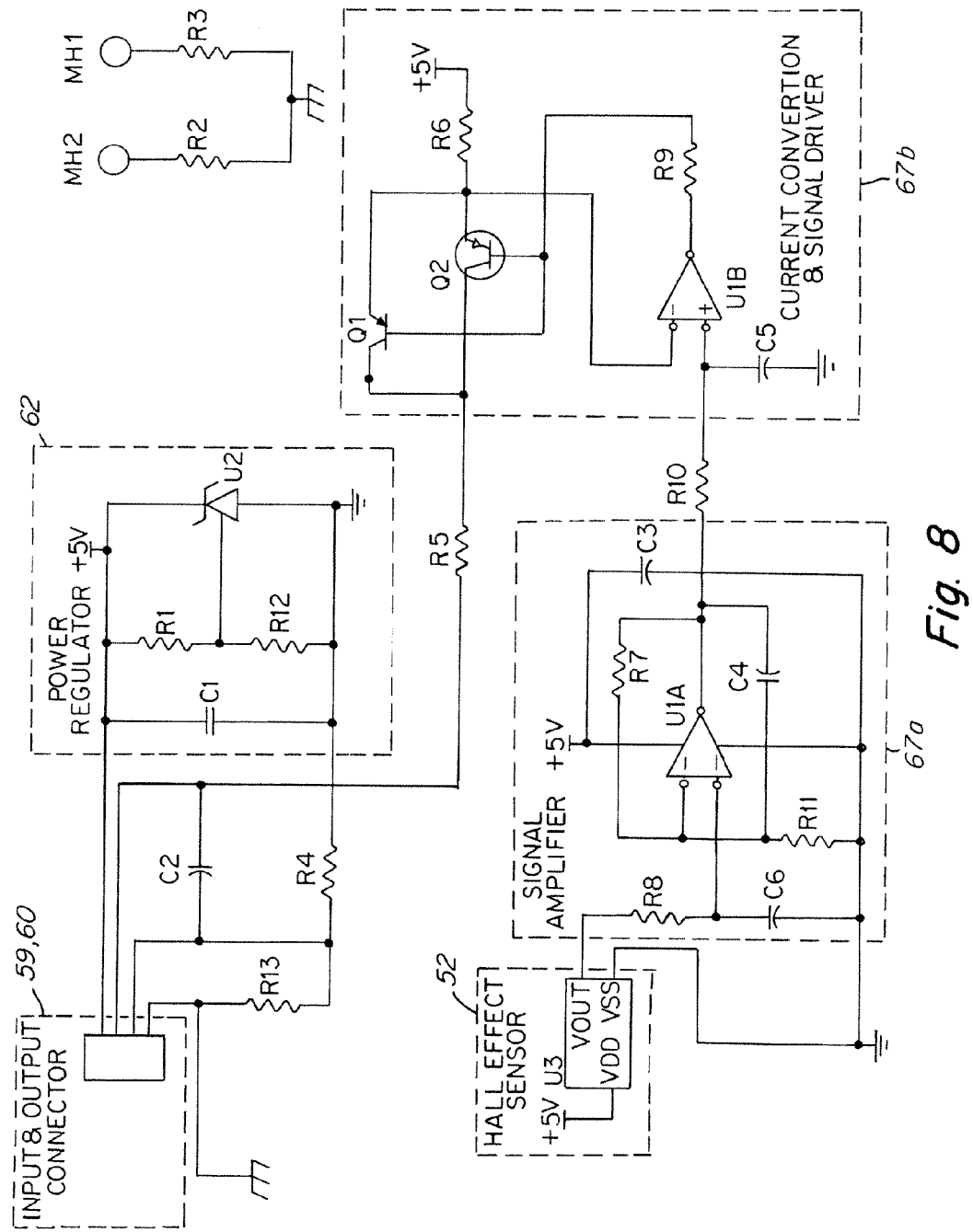
FIG. 8 is a schematic diagram of one embodiment of a hall effect sensor circuit.

FIG. 8 shows schematically a circuit diagram for a hall effect circuit 56 according to one embodiment of the invention. The circuit includes input and output connectors 59/60 which communicate with a power regulator 62. The hall effect sensor 52 produces a voltage output indicative of the flux density which is input to the signal amplifier 67a, and then transmitted to the current converter and signal driver 67b before being output to the controller 70. FIG. 8 shows one embodiment of a hall effect circuit that can be used in the present invention. Other embodiments are possible, which may include one or more of the same, alternative or additional components.

Figure 9:
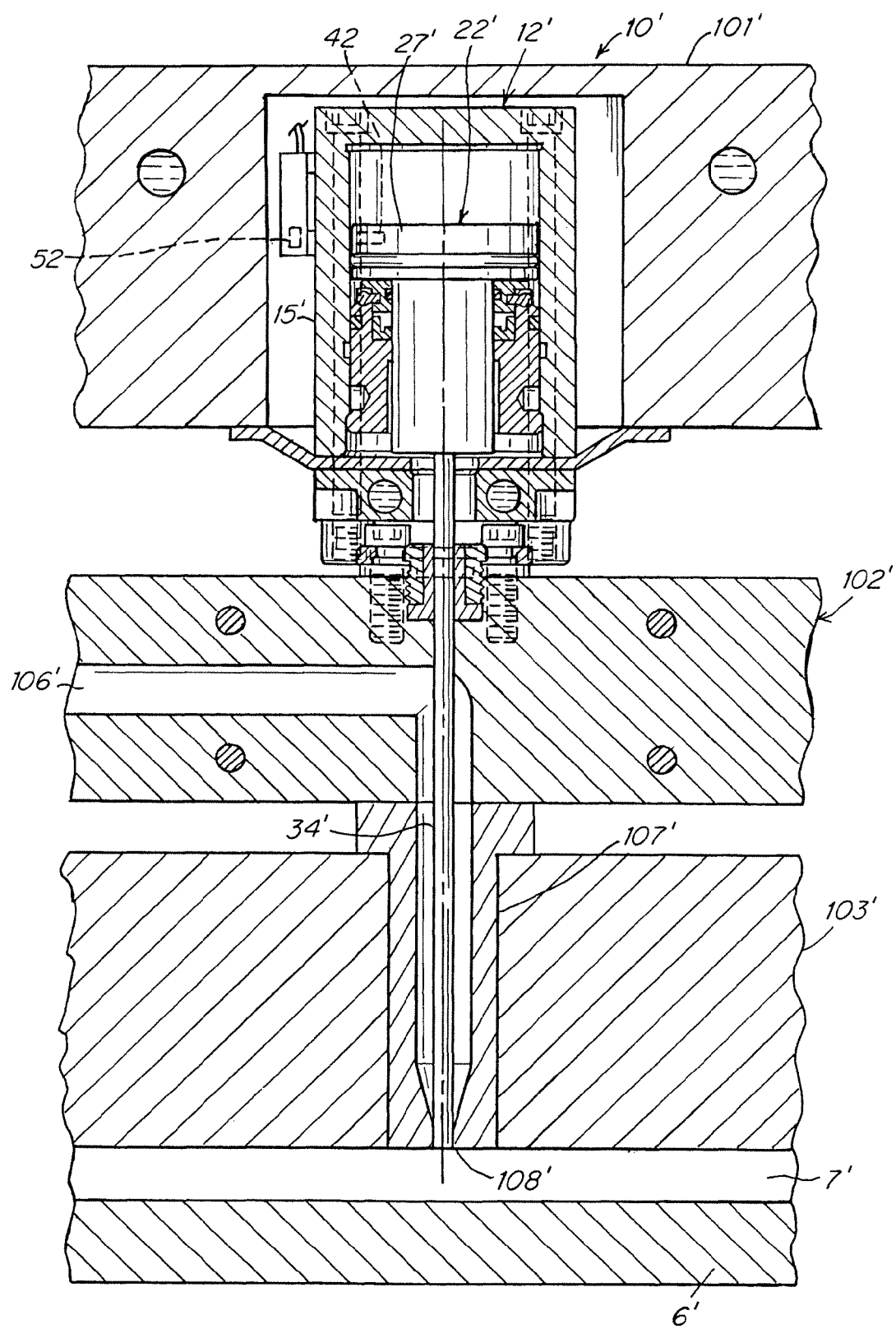
FIG. 9 is a cross-sectional view of an alternative embodiment of a position sensor mounted to an actuator housing that is mounted on a hot runner of an injection molding system.

FIG. 9 is a cross-section view of another embodiment of an injection molding apparatus, wherein an actuator 10' is mounted on the manifold 102', as opposed to on the top plate 101 as in FIG. 3. Otherwise the apparatus functions in the same way for purposes of the present invention. FIG. 9 shows a magnet 42 embedded in the sidewall of a piston head 27', radially aligned with a hall effect sensor 52 mounted to the exterior surface of an actuator cylinder 15'. The molten material is fed from a distribution channel 106' to nozzle 107', while pin 34' opens and closes gate 108' to mold cavity 7' of mold 6'.

Figure 10:
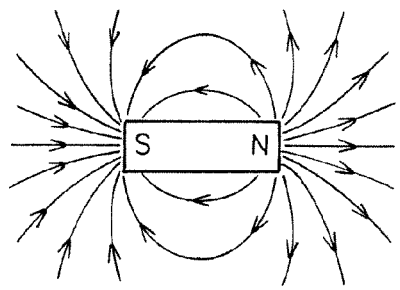
FIG. 10 is a schematic diagram of the magnetic field lines generated by an ideal cylindrical magnetic member.

FIG. 10 illustrates a magnetic field of an ideal cylindrical magnet with its axisccess of symmetry inside the image plane. The magnetic field at any given point is specified by both direction and magnitude (or strength), and thus comprises a vector field. A higher density of nearby field lines indicates a stronger magnetic field. The magnetic field points towards a magnet's south pole S and away from its north pole N. Permanent magnets are objects that produce their own persistent magnetic fields. They are made of ferromagnetic materials, such as iron and nickel, that have been magnetized, and they have both a north pole and a south pole.

Figure 11A:
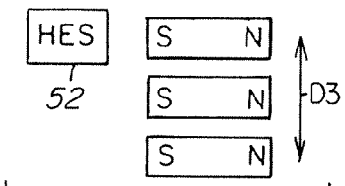
FIGS. 11A-F are a schematic illustration of a magnetic member on the piston being moved relative to the hall effect sensor (HES) in various orientations, wherein the flux density changes as the magnetic member position changes.
Figure 11D:
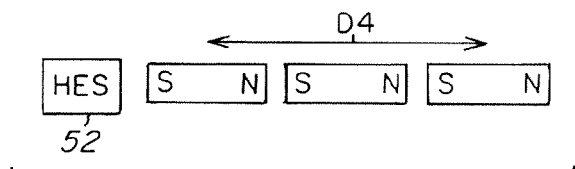
Figure 11B:
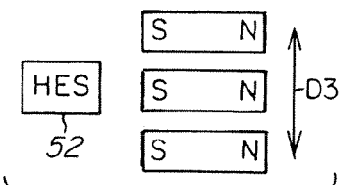
Figure 11E:
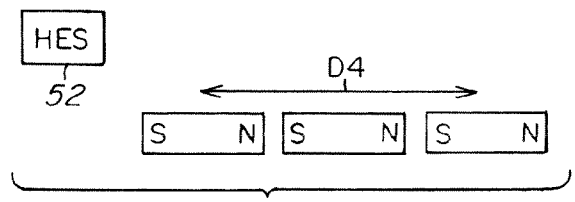
Figure 11C:
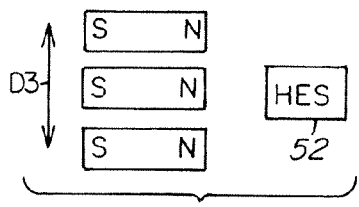
Figure 11F:
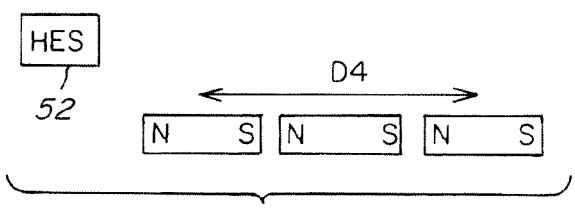

FIGS. 11A-F show six different orientations of a hall effect sensor (HES) 52 with respect to a piston magnet 42. The magnet can be moved relative to the hall effect sensor in various orientations, as long as the flux density changes as the magnet position changes. The orientation selected for a particular application would take into account the physical space, ease of output usage, and sensitivity to change desired for a particular application. In FIGS. 11A-C, the north-south axis of the magnet is transverse to the direction of movement D3 of the magnet, the latter being aligned with the axis A of the bore 14 of the actuator housing. The sensor can be disposed adjacent either end of the magnet, near the north pole or south pole. In contrast, in FIGS. 11D-F, the north-south axis of the magnet is aligned parallel with the direction D4 of movement of the magnet. Here, the hall effect sensor 52 can be mounted either at one end of the one or more magnets, offset from one end of the magnets, and/or the magnets can be disposed with either pole closer to the sensor. These and other orientations will be apparent to the skilled person.

While specific embodiments of the present invention have been shown and described, it will be apparent that many modifications can be made thereto without departing from the scope of the invention. Accordingly, the invention is not limited by the foregoing description.

The invention claimed is:

1. A method of determining a position of an actuator piston driving a valve pin in an injection molding apparatus, the apparatus including an actuator comprising:

an actuator housing having a body portion, surrounding an axial bore, of a substantially non-magnetic and/or magnetically permeable material, the piston, movable within the axial bore, for driving the valve pin, a magnetic member, embedded in the piston, having a north N pole end and a south S pole end defining a N-S axis and generating a magnetic field such that axial movement of the piston in the bore modifies the magnetic field according to the axial position of the piston relative to a detection position, a magnetic field detector comprising a hall effect sensor circuit mounted at the detection position on an exterior surface of the substantially non-magnetic and/or magnetically permeable body portion, wherein the sensor circuit detects the axial position of the piston relative to the detection position on the body portion by detecting the magnetic field of the magnetic member as modified by axial movement of the piston in the bore and generates a changing output signal that is unique to each axial position of the piston in the bore based on the detected modified magnetic field, wherein the magnetic member's N-S axis is disposed transverse to the direction of axial movement of the piston in the bore and the sensor circuit is disposed at the detection position adjacent either the north N pole end or the south S pole end of the magnetic member, and a drive mechanism for axially driving the piston in the bore, the method comprising:

detecting a change in degree or quality of the magnetic field of the magnetic member with the hall effect sensor circuit upon axial movement of the piston in the bore, determining the axial position of the piston in the bore according to the detected change in the degree or quality of the magnetic field, and using the determined axial position of the piston to instruct the drive mechanism to drive the piston in a predetermined manner during the course of an injection cycle.

2. The method of claim 1, including:

instructing the drive mechanism to drive the piston in the bore such that the piston travels upstream from a gate closed position to an intermediate upstream position at a first travel velocity and such that the piston further travels upstream from the intermediate position to a predetermined upstream position at a second travel velocity that is higher than the first travel velocity.

3. The method of claim 1, including:

using the determined axial position of the piston to control movement of the valve pin along a predetermined path of withdrawal from a gate of a mold at one or more predetermined drive rates or one or more predetermined velocities of withdrawal.

4. The method of claim 1, using the determined axial position of the piston in a closed loop control application.

5. The method of claim 1, using the determined axial position of the piston in an open loop monitoring application.

6. The method of claim 1, using the detected change to generate a control signal to the drive mechanism to control the piston position in the bore and receiving user input from a user interface for adjusting the control signal to control the piston position in the bore.

7. The method of claim 1, using the detected change for continuous monitoring of a valve pin position.

8. The method of claim 1, wherein the valve pin is driven by the piston to multiple positions with respect to a mold gate.

9. The method of claim 1, wherein the valve pin is positionable between open and closed positions with respect to a mold gate.

10. The method of claim 1, displaying for viewing on a user interface an indication of a valve pin position.

11. The method of claim 10, wherein the displaying comprises displaying via one or more of: lights, LEDs, a graph of pin position versus time, and an indicator of pin open and pin closed.

12. The method of claim 1, wherein the body portion is non-magnetic.

13. The method of claim 1, wherein the magnetic member is a permanent magnet that produces its own persistent magnetic field.

14. The method of claim 1, wherein the magnetic field comprises a vector field wherein a higher density of nearby field lines indicates a stronger magnetic field, and the magnetic field points towards the south pole S and away from the north pole N.

15. The method of claim 1, wherein the magnetic member comprises a ferromagnetic material.

16. An apparatus for determining a position of an actuator piston driving a valve pin in an injection molding apparatus, the apparatus including an actuator comprising:

an actuator housing having a body portion, surrounding an axial bore, of a substantially non-magnetic and/or magnetically permeable material, a piston, movable within the axial bore, for driving a valve pin, a magnetic member, embedded in the piston, having a north N pole end and a south S pole end defining a N-S axis and generating a magnetic field such that axial movement of the piston in the bore modifies the magnetic field according to the axial position of the piston relative to a detection position, a magnetic field detector comprising a hall effect sensor circuit mounted at the detection position on an exterior surface of the substantially non-magnetic and/or magnetically permeable body portion, wherein the sensor circuit detects the axial position of the piston relative to the detection position on the body portion by detecting a change in degree or quality of the magnetic field of the magnetic member as modified by axial movement of the piston in the bore and generates a changing output signal that is unique to each axial position of the piston in the bore based on the detected change in the degree or quality of the magnetic field, wherein the magnetic member's N-S axis is disposed transverse to the direction of axial movement of the piston in the bore and the sensor circuit is disposed at the detection position adjacent either the north N pole end or the south S pole end of the magnetic member, and an electronic controller processing the changing output signal of the sensor circuit to generate a control signal to drive the piston in a predetermined manner during the course of an injection cycle.

17. The apparatus of claim 16, wherein the electronic controller generates the control signal to drive the piston in the bore such that the piston travels upstream from a gate closed position to an intermediate upstream position at a first travel velocity and such that the piston further travels upstream from the intermediate position to a predetermined upstream position at a second travel velocity that is higher than the first travel velocity.

18. The apparatus of claim 16, wherein the electronic controller generates the control signal to control movement of the valve pin along a predetermined path of withdrawal from a gate of a mold at one or more predetermined drive rates or one or more predetermined velocities of withdrawal.

19. A method of determining a position of an actuator piston driving a valve pin in an injection molding apparatus, the apparatus including an actuator comprising:

an actuator housing having a body portion, surrounding an axial bore, of a substantially non-magnetic and/or magnetically permeable material, the piston, movable within the axial bore, for driving the valve pin, a magnetic member, embedded in the piston, having a north N pole end and a south S pole end defining a N-S axis and generating a magnetic field such that axial movement of the piston in the bore modifies the magnetic field according to the axial position of the piston relative to a detection position, a magnetic field detector comprising a hall effect sensor circuit mounted at the detection position on an exterior surface of the substantially non-magnetic and/or magnetically permeable body portion, wherein the sensor circuit detects the axial position of the piston relative to the detection position on the body portion by detecting the magnetic field of the magnetic member as modified by axial movement of the piston in the bore and generates a changing output signal that is unique to each axial position of the piston in the bore based on the detected modified magnetic field, wherein the magnetic member's N-S axis is disposed transverse to the direction of axial movement of the piston in the bore and the sensor circuit is disposed at the detection position adjacent either the north N pole end or the south S pole end of the magnetic member, and a drive mechanism for axially driving the piston in the bore, the method comprising:

detecting a change in degree or quality of the magnetic field of the magnetic member with the hall effect sensor circuit upon axial movement of the piston in the bore, determining the axial position of the piston in the bore according to the detected change in the degree or quality of the magnetic field, and instructing the drive mechanism to drive the piston in the bore such that the piston travels upstream from a gate closed position to an intermediate upstream position at a first travel velocity and such that the piston further travels upstream from the intermediate position to a predetermined upstream position at a second travel velocity that is higher than the first travel velocity.

* * * * *